Nov. 7, 1950     A. ROEST ET AL     2,528,914
SLICING MACHINE HAVING CUTTER DISK
WITH PLANETARY MOVEMENT

Filed Dec. 29, 1945     2 Sheets-Sheet 1

INVENTORS
Arie Roest
Jacobus Roest
BY
George H. Carey
ATTORNEY

INVENTORS
Arie Roest
Jacobus Roest

Patented Nov. 7, 1950

2,528,914

UNITED STATES PATENT OFFICE 2,528,914

SLICING MACHINE HAVING CUTTER DISK WITH PLANETARY MOVEMENT

Arie Roest and Jacobus Roest, Amsterdam, Netherlands

Application December 29, 1945, Serial No. 638,147 In the Netherlands August 27, 1942

Section 1, Public Law 690, August 8, 1946 Patent expires August 27, 1962

7 Claims. (Cl. 146—101)

The invention relates to a machine for slicing sausage and similar meat products, which machine, however, may also be adapted for cutting French beans, cabbage and the like e. g. in the manner usual for preserving such foods.

This machine belongs to the kind comprising a bearing support rotatable about a central axis for a horizontal cutting disc which is rotatable about its own vertical shaft and which for this purpose may be driven by an actuating mechanism e. g. a planet driving gear.

For the purpose of slicing the material in a slicing machine of this kind this material is applied to the cutting means from above under the action of gravity and, if desired, may be assisted by mechanical or manual pressure. The slicing disc co-operates with a lower table or cutting plate on the top of which the material is supported during the slicing action. The cutting disc is then located above a recess in the lower table and the cutting edge of the said disc co-operates with the upper edge of the said recess.

It is known e. g. from German Patent Specification No. 233,918 to control the thickness of the slices for such a machine by raising or lowering the position of the circular knife with the aid of a setting screw, that is to say by either increasing or decreasing the distance between the cutting surface and the lower table that is stationary in one and the same horizontal plane.

It has been found, however, that this method of determining the thickness of the slices, according to which the cutting disc is adjustable, has the drawback that one does not obtain clean cut slices.

In order to obviate this drawback, the cutting disc or circular knife according to the invention is constantly held in the same horizontal plane, whereas the table is vertically adjustable with regard to the cutting disc. The lower table which together with the cutting disc is rotatable about the central vertical shaft of the slicing machine must thereof be located adjustably in a vertical direction with respect to the bearing construction of the cutting disc. The adjustability of the table may be obtained, according to the invention, by means of a manually operated nut provided on the threaded top of a stationary vertical shaft, which nut acts on the lower table which is slidably positioned on the said shaft and which is adjustable against the action of a spring. In this manner it is possible to control in a simple manner from a central point of the machine the thickness of the slices while the machine is operating.

The invention will now be further explained with the aid of the accompanying drawing in which similar reference characters designate corresponding parts throughout the several views.

Figure 1:
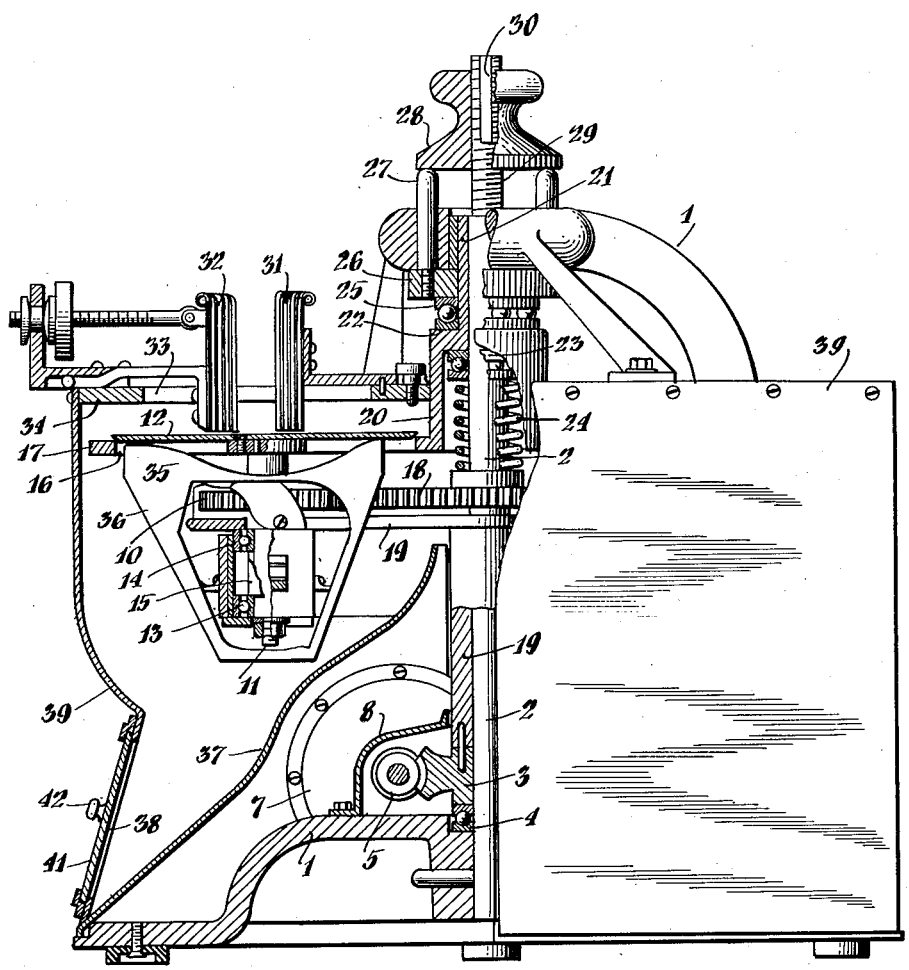
Fig. 1 represents partly a vertical section, and partly a front view of a slicing machine according to the invention.
Figure 2:
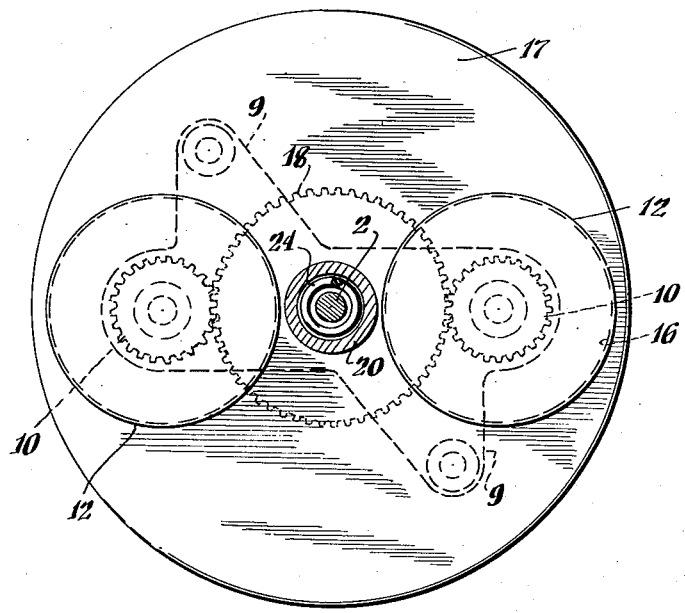
Fig. 2 represents a top view of the lower table of the machine.

A vertical shaft 2 is fixedly mounted in a frame 1. A worm wheel 3 is rotatable about said shaft. Said worm wheel rests on a thrust-bearing 4 and is driven by a worm 5 on a worm-shaft 6 which is driven by a motor 7. The worm-gear is enclosed in a protecting housing 8. The rotative movement of the worm-wheel 3 is transmitted to a pair of oppositely disposed horizontal arms 9 each carrying a toothed wheel 10. The said toothed wheels 10 are rigidly connected to knife-spindles 11, on the upper end of which circular horizontal knives 12 are attached. The knife-spindles are supported by ball-bearings 13 and 14 between which stuffing boxes 15 are arranged. The knives 12 are arranged over circular openings 16 in a table 17 which, with respect to the knife-spindles and consequently with respect to the knives mounted thereon, is adapted to be adjusted in a vertical direction. The toothed wheels 10 which are mounted on the knife-spindles 11 mesh with a sun-wheel 18 on the stationary vertical shaft 2 which is rigidly mounted in the frame of the machine. The worm wheel 3 and a hollow shaft 19 which is coupled thereto are rotatable upon said shaft 2, the hollow shaft being connected to the horizontal arm 9 with its accessories. If the arm 9 rotates together with the hollow shaft 19, the toothed wheels 10 are in rolling contact with the stationary sun-wheel 18 and consequently the circular knives 12 perform a movement of revolution about the shaft 2 as well as a rotary movement upon the knife-spindles 11.

In its centre the table 17 is constructed as a vertical sleeve having a wide lower portion 20 and a narrow upper portion 21 which is adapted to be adjusted in a vertical direction upon the shaft 2. The collar 22 formed by the merging of the wide portion 20 into the narrow portion 21 rests on a thrust ball bearing 23, which in its turn rests on a vertical spiral thrust spring 24, located with its lower portion bearing on the hub of the stationary sun-wheel 18. This spring therefore surrounds the shaft 2 between the sun-wheel 18 and the thrust bearing 23. On the collar 22 there is provided a thrust ball bearing 25 on which there is supported a pressring 26 into which the lower ends of press pins 27 are screwed, these pins passing through a part of frame 1 surrounding shaft 2 and the upper ends of said pins being adapted to co-operate with a knob or nut 28 which is screwed upon the upper end 29 of the shaft 2 which is provided at this end with an exterior screw thread. By means of a scale 30 the adjustment of the knob or nut may be read off. With the aid of the said nut the thickness of the slices may be controlled. If the nut is screwed down to press upon the pins 27, the press ring 26 and the thrust-bearing 25 move the collar 22 and sleeve 20 and table 17 carried thereby against the action of the spiral spring 24 into a lower horizontal position with respect to the circular knives 12 and consequently a thicker slice will be cut. This adjustment may be effected during the operation of the slicer. When the table 17 is thus being adjusted, the guiding pins 40 attached thereto will slide through corresponding bores in the horizontal arm 9, the table 17 and its openings for the knives 12 being thereby maintained in proper relation to arm 9 and the spindles 11 carrying the knives 12 as these parts revolve about shaft 2.

The material to be sliced is clamped above the table, that is to say centrally above the path of the circular knives, between a stationary clamping-jaw 31 and a loose or adjustable clamping-jaw 32, said clamping-jaws protruding through an opening 33 in an upper table 34. The material for example a sausage, is guided between the clamping-jaws by means of ribs provided on the same.

Figure 3:
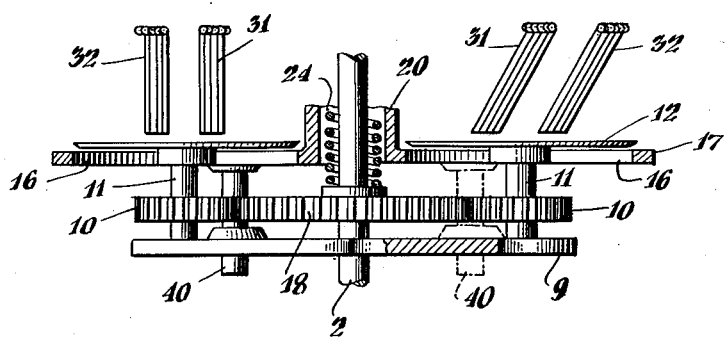
Fig. 3 represents diagrammatically and on a smaller scale the driving mechanism of the circular knives and the adjusting device for the lower table.

As indicated in Fig. 3 the sets of clamping-jaws 31 and 32 may be arranged in vertical position as well as at an angle.

If the sausage is fed to the knives by the vertically mounted clamping-jaws, the rotating knives will cut circular slices thereof.

If, however, the sausage is supplied by the clamping jaws which are arranged at an angle, oval slices will be cut which is particularly of interest with sausages having a small diameter as oval slices are more economical when making sandwiches.

According to the invention, if desired, the upper table 34 may be rotatable about the central shaft 2. By causing the upper table to make half a turn about the said shaft, the vertical clamping jaws are moved from the left hand position represented in Fig. 3 into the right hand position in which the clamping jaws arranged at an angle are represented, and conversely.

The upper table may be locked in either of the two working positions by means of a bolt not represented in the drawing.

The reference numeral 35 designates a shield for the toothed wheels while 36 denotes a guide plate for the slices and 37 a protecting device for the motor, which protecting device also serves as a guide means for the slices when these are conducted to an outlet opening 38 in a protecting plate 39 which surrounds the machine.

The outlet opening 38 may be closed by means of a plate-shaped slide member 41 or the like provided with a button or knob 42.

When the said slide member is opened, the current to the electric motor is switched off, by means of a switching device provided on the said member and not represented in the drawing, in order to prevent accidents which might occur when the sliced material is removed from the machine.

The above mentioned slicing machine may be provided with one or with two or more cutting discs or circular knives.

We claim:

1. In a slicing machine the combination with a frame, a cutting plate adapted for rotation thereof on an axis transverse to the plane of said cutting plate, and a circular disc knife adapted to be rotated on its axis, of means carried by and fixed in relation to said frame for supporting said cutting plate for rotation thereof on and for movement thereof along its axis relative to said fixed means, a member supported by said frame for rotation thereof upon said axis of said cutting plate and supporting said disc knife for rotation thereof on its axis offset from the axis of rotation of said cutting plate and with the plane of the disc parallel to the plane of said cutting plate and in cutting relation thereto, means operatively connecting said cutting plate and said member for effecting rotation of said member to effect revolution of said disc knife supported thereby about the axis of said cutting plate concomitantly with the rotation of said cutting plate upon said axis thereof, means for effecting rotation of said disc knife on its axis while being so revolved, and means supported by said fixed means for movement relative thereto and operatively connected to said cutting plate and operable at will during said rotation of said cutting plate for moving said cutting plate along its axis relative to said fixed means to change the cutting relation of said disc knife and said cutting plate.

2. In a slicing machine the combination with a frame, a cutting plate adapted for rotation thereof on an axis perpendicular to the plane of said cutting plate, and a circular disc knife adapted to be rotated on its axis, of a shaft fixed in said frame and supporting said cutting plate for rotation thereof with its axis coincident with the axis of said shaft and for movement of said plate axially along said shaft, a member supported on said shaft for rotation thereof on the axis of said shaft and supporting said disc knife for rotation thereof on its axis parallel to and offset from the axis of said shaft and with the plane of the disc parallel to and in cutting relation to the plane of said cutting plate, means operatively connecting said cutting plate and said member for effecting rotation of said member and revolution of said disc knife supported thereby about the axis of said shaft concomitantly with rotation of said cutting plate upon said axis of said shaft, means cooperating with said fixed shaft and said member for effecting rotation of said disc knife on its axis as said disc knife is so revolved, and means movable relative to said fixed shaft and operatively connected to said cutting plate and operable to effect movement of said cutting plate relative to said shaft to and fro parallel to the axis of said shaft to change the cutting relation of said disc knife to said cutting plate.

3. In a slicing machine the combination as defined in claim 2 which comprises a stationary sun gear supported on said fixed shaft, a planetary gear supported upon said member and meshing with said sun gear and connected in driving relation to said disc knife to effect rotation of said disc knife on its axis upon rotation of said member and revolution of said disc knife about the axis of said shaft.

4. In a slicing machine the combination as defined in claim 2 which comprises a stationary sun gear supported on said fixed shaft, a planetary gear supported upon said member and meshing with said sun gear and connected in driving relation to said disc knife to effect rotation of said disc knife on its axis upon rotation of said member and revolution of said disc knife about the axis of said shaft, and driving means operatively connected to said member for effecting rotation thereof on the axis of said shaft.

5. In a slicing machine the combination with a frame, a cutting plate adapted for rotation thereof on an axis perpendicular to the plane of said cutting plate, and a circular disc knife adapted to be rotated on its axis, of a shaft fixed in said frame and supporting said cutting plate for rotation thereof with its axis coincident with the axis of said shaft and for movement of said plate axially along said shaft, a member supported on said shaft for rotation thereof on the axis of said shaft and supporting said disc knife for rotation thereof on its axis parallel to and offset from the axis of said shaft and with the plane of the disc parallel to and in cutting relation to the plane of said cutting plate, means operatively connecting said cutting plate and said member for effecting rotation of said member and revolution of said disc knife supported thereby about the axis of said shaft concomitantly with rotation of said cutting plate upon said axis of said shaft, means cooperating with said member for effecting rotation of said disc knife on its axis as said disc knife is so revolved, means movable relative to said fixed shaft and operatively connected to said cutting plate and operable at will to effect movement of said cutting plate relative to said shaft in a given direction parallel to the axis of said shaft against the bias of a resilient member supported on said fixed shaft to change the cutting relation of said disc knife to said cutting plate, said resilient member being adapted to effect reverse movement of said cutting plate upon reverse operation of said means operable at will, and means providing for rotation of said cutting plate relative to said means operable at will.

6. In a slicing machine the combination with a frame, a cutting plate adapted for rotation thereof on an axis perpendicular to the plane of said cutting plate, and a circular disc knife adapted to be rotated on its axis, of a shaft fixed in said frame and supporting said cutting plate for rotation thereof with its axis coincident with the axis of said shaft and for movement of said plate axially along said shaft, a member supported on said shaft for rotation thereof on the axis of said shaft and supporting said disc knife for rotation thereof on its axis parallel to and offset from the axis of said shaft and with the plane of the disc parallel to and in cutting relation to the plane of said cutting plate, means operatively connecting said cutting plate and said member for effecting rotation of said member and revolution of said disc knife supported thereby about the axis of said shaft concomitantly with rotation of said cutting plate upon said axis of said shaft, means cooperating with said member for effecting rotation of said disc knife on its axis as said disc knife is so revolved, a manually operable nut threaded on said shaft, means actuated by said nut and engaging said cutting plate for effecting axial movement of said cutting plate upon rotational movement of said nut upon said threaded shaft while providing for rotation of said cutting plate relative thereto, and a resilient member carried by said shaft and engaging said cutting plate to bias said cutting plate in a given direction of movement thereof parallel to the axis of the shaft, said manually operable nut being operable to actuate said means actuated by said nut to move said cutting plate against the bias of said resilient member.

7. In a slicing machine the combination with a frame, a cutting plate adapted for rotation thereof on an axis perpendicular to the plane of said cutting plate, and a circular disc knife adapted to be rotated on its axis, of a shaft fixed in said frame and supporting said cutting plate for rotation thereof with its axis coincident with the axis of said shaft and for movement of said plate axially along said shaft, a member supported on said shaft for rotation thereof on the axis of said shaft and supporting said disc knife for rotation thereof on its axis parallel to and offset from the axis of said shaft and with the plane of the disc parallel to and in cutting relation to the plane of said cutting plate, means operatively connecting said cutting plate and said member for effecting rotation of said member and revolution of said disc knife supported thereby about the axis of said shaft concomitantly with rotation of said cutting plate upon said axis of said shaft, means cooperating with said member for effecting rotation of said disc knife on its axis as said disc knife is so revolved, a manually operable nut threaded on said shaft, and a ring supported in said frame with its axis coincident with the axis of said shaft and for slidable movement thereof along said shaft, said ring operatively engaging said cutting plate for effecting axial movement of said cutting plate upon movement of said ring along said shaft while providing for rotation of said cutting plate relative to said ring, said manually operable nut being operatively connected to said ring to effect said movement of said ring along said shaft upon threading rotation of said nut thereon.

ARIE ROEST.
JACOBUS ROEST.

REFERENCES CITED

The following references are of record in the file of this patent:

UNITED STATES PATENTS

| Number | Name | Date |
|---|---|---|
| 118,035 | Massey | Aug. 15, 1871 |
| 931,295 | Hagemeyer | Aug. 17, 1909 |
| 976,613 | Smith | Nov. 22, 1910 |
| 1,663,543 | Buck | Mar. 27, 1928 |
| 1,942,563 | Mood | Jan. 9, 1934 |
| 2,166,648 | Swofford | July 18, 1939 |
| 2,414,152 | Jackson | Jan. 14, 1947 |

FOREIGN PATENTS

| Number | Country | Date |
|---|---|---|
| 233,918 | Germany | Apr. 26, 1911 |